Feb. 25, 1941. W. L. KAUFFMAN, 2D 2,232,706
WRINGER SAFETY RELEASE
Filed March 17, 1937 2 Sheets-Sheet 1
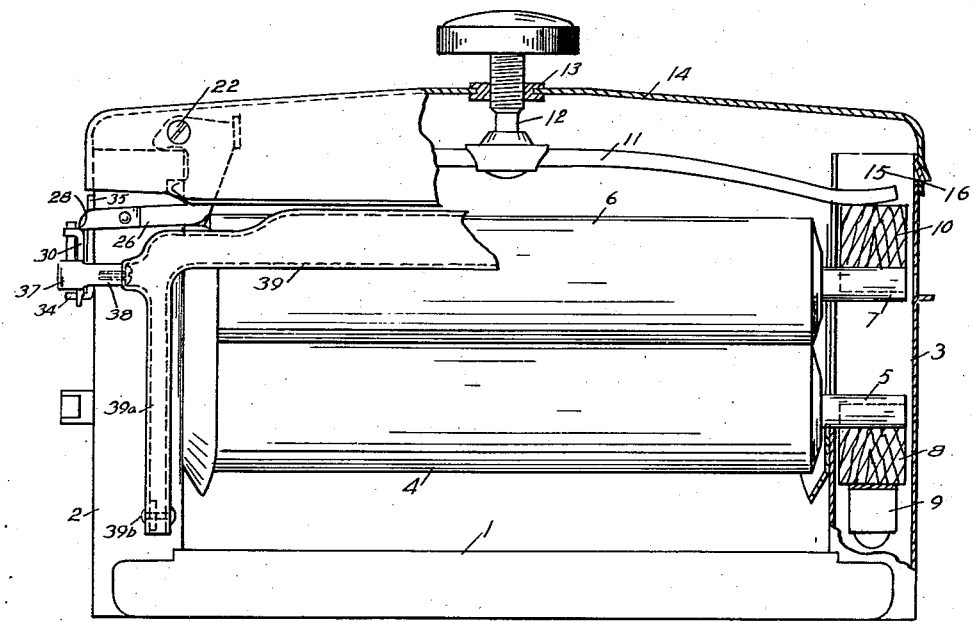
FIG. 1.
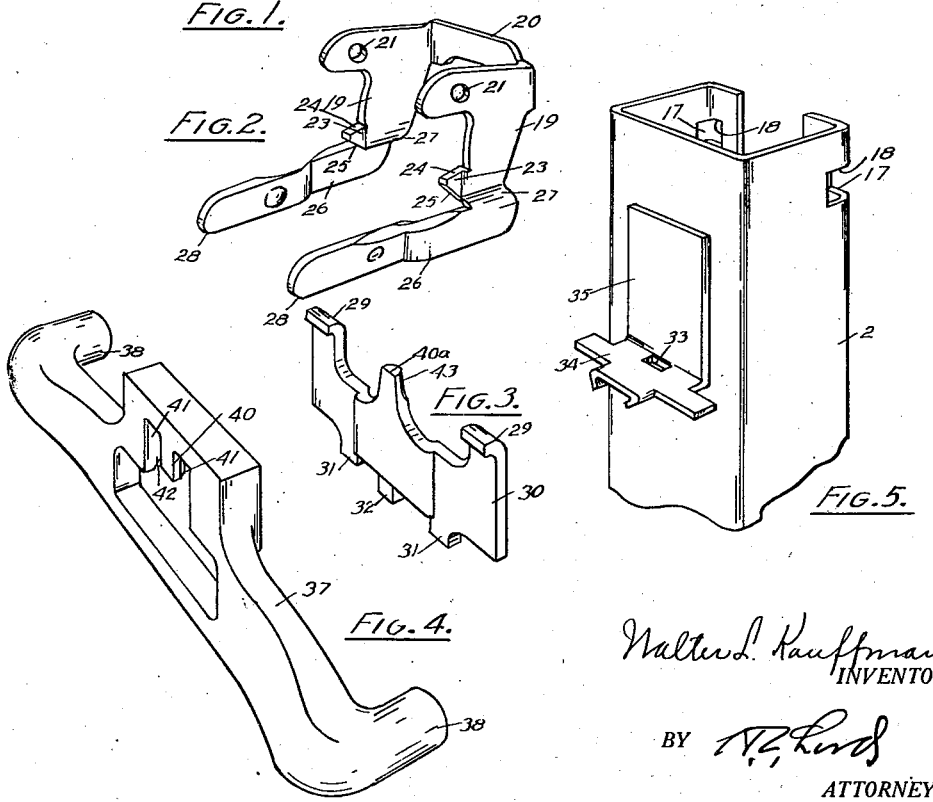
FIG. 2.
FIG. 3.
FIG. 4.
FIG. 5.
Walter L. Kauffman II
INVENTOR.
BY
ATTORNEYS.

Feb. 25, 1941.  W. L. KAUFFMAN, 2D  2,232,706
WRINGER SAFETY RELEASE
Filed March 17, 1937   2 Sheets-Sheet 2
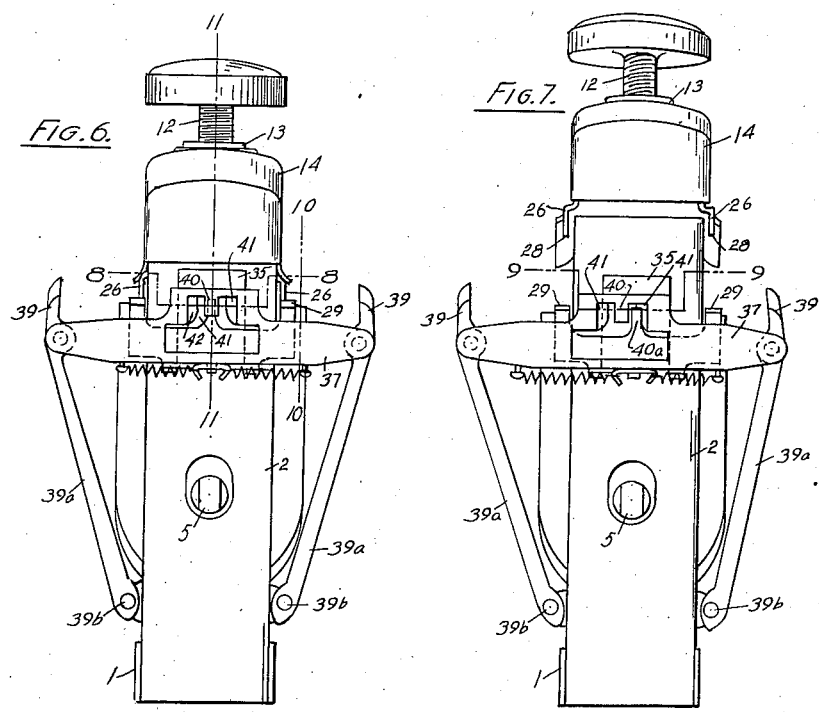
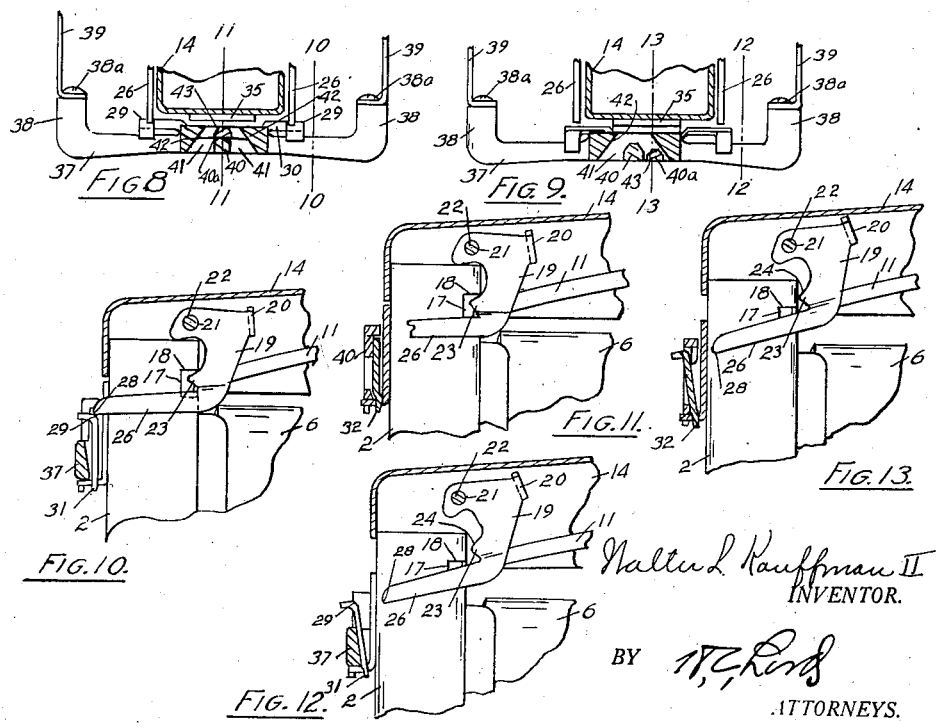
Walter L. Kauffman II
INVENTOR.
BY
ATTORNEYS.

Patented Feb. 25, 1941

2,232,706

UNITED STATES PATENT OFFICE 2,232,706

WRINGER SAFETY RELEASE

Walter L. Kauffman, II, Erie, Pa., assignor to Lovell Manufacturing Company, Erie, Pa., a corporation of Pennsylvania Application March 17, 1937, Serial No. 131,332

9 Claims. (Cl. 68—263)

Power wringers are now ordinarily provided with safety releases which are designed to afford means for instantly releasing the pressure on the wringer rolls should the operator get caught in the rolls. The pressure spring on the wringer rolls, the pressure of which is released, exerts very heavy pressure on the rolls and a very heavy counter-pressure on the release mechanism. In consequence if engaged surfaces of the release mechanism are moved sufficiently to break the engagement by the direct movement of those surfaces through the force applied by the operator, a very considerable force is required to effect the release.

Inasmuch as this release is accomplished ordinarily under panic conditions a very sensitive release is desirable, and various expedients have been used to accomplish this purpose with which type of release the releasing surfaces are engaged in a stable condition. That is, the surfaces themselves are of a nature that they will retain their set positions except when forcibly moved from this position. The amount of effort required to accomplish the release is measured very largely by the extent of the unstable condition. This unstable condition, however, does assure the mechanism against accidental release through the very fact that the engaged surfaces are in stable relation.

Another type of release provides engaging surfaces receiving the direct counter-pressure of the spring which, in themselves, are unstable, that is, these surfaces would automatically accomplish a release through the pressure of the spring itself except that these mechanisms are provided with locking devices that lock the unstable engaging surfaces in engaged position. The engaged surfaces must be of such unstability that the mechanism will be positively released when the parts are unlocked by the locking device. In order to assure this positive release considerable pressure is exerted on the locking device and to this extent the device lacks sensitiveness.

The present invention is designed to provide a simple and rugged release mechanism and one that is sensitive as to the effort required to effect a release, one that is positively locked against accidental release, and preferably one that is positively released when unlocked. Features and details of the invention will appear more fully from the specification and claims.

A preferred embodiment of the invention is illustrated in the accompanying drawings, as follows:

Fig. 1 shows a front elevation of a wringer embodying the invention, partly in section.

Fig. 2 a perspective view of a latch included in the release mechanism.

Fig. 3 a perspective view of a trip plate operating in connection with the latch.

Fig. 4 a perspective view of a holding plate operating in connection with the trip plate.

Fig. 5 a perspective view of the upper end of a stile on which the releasing parts are mounted.

Fig. 6 an end view of the wringer in set position.

Fig. 7 an end view of the wringer in release position.

Fig. 8 a section on the line 8—8 in Fig. 6.

Fig. 9 a section on the line 9—9 in Fig. 7.

Fig. 10 a section on the line 10—10 in Fig. 6, the parts being in set position.

Fig. 11 a section on the line 11—11 in Fig. 6.

Fig. 12 a section on the line 10—10, but with the parts released.

Fig. 13 a similar view of the parts but in section on the line 11—11 in Fig. 6.

1 marks a base of the wringer frame, 2 and 3 stiles extending upwardly from the base, 4 a lower roll having a shaft 5, an upper roll 6 having a shaft 7, lower bearing 8 for the shaft 5, the bearings 8 being supported by brackets 9 in the side stiles, upper bearings 10 for the shaft 7 slidingly mounted in the upper ends of the stiles. 11 a plate spring forming the pressure means, the ends of the spring resting on the upper bearing 10. 12 an adjusting screw engaging the spring and extending through a screw-threaded fitting 13 in the top bar 14. A shoulder 15 struck up in the stile 3, and a shoulder 16 formed in the end of the top. These shoulders are interlocking and adapted to detachably lock the top on the stile. The stiles 3 as shown are of sheet metal and are rectangular in cross-section, having inwardly turned flanges on the inner faces of the stiles, slotted to receive the shafts 5 and 7. Notches 17 are arranged in the inner corners of the stile 2 near its upper end. These notches forming latch shoulders 18.

A latch made up of the side plates 19 connected by a cross plate 20 is pivoted on the top bar by a bolt 22 extending through the walls of the top bar and perforations 21 in the side plates 19. The latch plates 19 are provided with hooks 23 having engaging surfaces 24. These engaging surfaces being adapted to engage the shoulders 18 on the stile when the top is in set position. The engaging surfaces 24 are slightly inclined with relation to the line joining the pivot, and these surfaces at their point of engagement with the shoulders 18. The under sides of the hooks are beveled at 25 so as to assure the swing of the hooks to clear the inner faces of the stile when the top bar is moved down to place, the hooks swinging back under the shoulders 18 upon reaching that position.

Arms 26 are connected with the plates 19 by webs 27, the web affording an offset position for the arms, giving the proper clearance for the arms outside of the stiles. The forward ends of the arms have trip surfaces 28.

The trip surfaces 28 engage the trip surfaces 29 on the trip plate 30. The trip plate 30 has the downwardly extending projections 31 and 32 along its lower edge. The projection 32 extends through an opening 33 in the shelf 34 of a bracket 35. The projections 31 extend into spaces between the stile and lips 36, the lips 36 extending from the shelf 34. These projections have sufficient clearance with relation to the spaces and opening 33 to permit a slight in and out pivotal movement of the trip plate.

Holding bars 37 have the inturned ends 38, and these are pivotally connected by screws 38a with a bail 39, the ends 39a of the bail being pivoted at 39b on the front faces of the stiles. It will be understood that there is a bail arranged at the front and rear of the wringer and this extends along the front of the wringer so as to be readily engaged by the operator to effect a release operation.

A locking shoulder 40 is arranged in the holding bar 37 and this engages a trip finger 40a on the trip plate 30 and locks the trip plate in set position and to retain the engagement of the surfaces 28 and 29 while the wringer is in set position. The holding shoulder 40 is arranged between slots 41—41 at each side of the shoulder and these slots have cam surfaces 42 along their outer walls, the cam surfaces being adapted to engage the trip finger 40a when the bar 37 is moved sidewise, the trip finger preferably being beveled at 43 to facilitate the camming action.

In the operation of the wringer with the parts in set position (see Fig. 8), the latches are held in this position because the trip plate 30 is held in set position through the engagement of the trip finger 40a with the shoulder 40. The inclination of the engaging surfaces 24 of the hooks 23 is definitely unstable so that when the latch is free to move the hooks disengage under the pressure of the spring. The inclination of the engaging surfaces 28 and 29 is so related to frictional resistance to movement of said surfaces as to provide an approximately neutral position between a stable condition of these parts under pressure and an unstable condition. Preferably if there is any variation, there should be a very slight unstable condition. Under these conditions the pressure thrust of the trip finger 40a on the shoulder 40 is very slight. In fact if the parts are exactly in neutral there will be no pressure. In relating these surfaces, the jar of the wringer of course is taken into consideration.

The holding bar 37 through the shoulder 40 positively locks the release device against an accidental release, but when the bar is moved in either direction through the action of the operating bar 39 the trip finger is brought opposite a slot 41. If the engaging surfaces of the latch are neutral, the trip plate will not move to release position and where this happens the further movement of the holding bar brings a cam surface 42 into engagement with the trip finger and forcibly moves the trip plate outwardly or into release position. Inasmuch as the inclined surfaces are practically at neutral, this outward movement requires little effort in its accomplishment. As soon as the trip plate is moved outwardly the latch by reason of the inclination of the engaging surfaces 24 is swung to release position releasing the hooks, permitting the release end of the top bar to swing upwardly which ordinarily will disengage the shoulders 15 and 16, permitting a complete release of pressure on the rolls.

What I claim as new is:

1. In a wringer having a frame comprising a releasable top, rolls mounted in the frame; pressure means exerting pressure on the rolls and counterpressure on the top; the combination with the frame of a safety release device operating to release the top from the frame comprising a latch receiving pressure of the pressure means, a trip means engaging the latch with a relation resisting release of the latch approximating neutral between stable and unstable engagement and operable at neutral, mechanism operating on the trip means preventing release movement relatively to the latch, and an operating bar mounted on the frame actuating said mechanism to effect a release.

2. In a wringer having a frame comprising a releasable top, rolls mounted in the frame; pressure means exerting pressure on the rolls and counterpressure on the top; the combination with the frame of a safety release device operating to release the top from the frame comprising a latch mounted on the top receiving pressure of the pressure means, a trip means mounted on the frame engaging the latch with a relation resisting release of the latch approximating neutral between stable and unstable engagement and operable at neutral, mechanism operating on the trip means preventing release movement relatively to the latch, and an operating bar mounted on the frame actuating said mechanism to effect a release.

3. In a wringer having a frame comprising a detachable top bar, rolls mounted in the frame; pressure means exerting pressure on the rolls and counterpressure on the top bar; the combination with the frame of a safety release device comprising a latch mounted on the top bar, a trip plate engaging the latch with a relation resisting release of the latch approximating neutral between stable and unstable engagement and operable at neutral, said trip plate having pivotal projections, a bracket on the frame forming recesses receiving the projections and forming a pivotal connection between the trip plate and the frame, and mechanism holding the trip plate normally in set position, said mechanism having devices compelling when actuated a releasing movement of the trip plate.

4. In a wringer having a frame comprising a detachable top bar, rolls mounted in the frame; pressure means exerting pressure on the rolls and counterpressure on the top bar; the combination with the frame of a safety release device comprising a latch mounted on the top bar, a trip plate engaging the latch with a relation resisting release of the latch approximating neutral between stable and unstable engagement and operable at neutral, and holding means having a holding shoulder engaging the trip plate and normally holding it in set position, said holding means having slots into which the engaging portion of the trip plate may move, said slots being provided with cam walls compelling a releasing movement of the trip plate with a movement of the holding means.

5. In a wringer having a frame rolls mounted in the frame and pressure means exerting pressure on the rolls comprising detachable pressure receiving devices communicating the counter-pressure of the means to the frame; the combination with the pressure means of a safety release device comprising a latch locking said pressure receiving devices in position to apply the pressure of the pressure means, a trip means engaging the latch and holding it against release by a movement of the trip device to release the pressure means, the trip means being substantially neutral between stable and unstable under the urge of the latch and adapted to release the latch by a movement from the neutral position, and controlling means acting on the trip means preventing release movement thereof relatively to the latch and actuating, when operated, the trip means to effect a release.

6. In a wringer having a frame rolls mounted in the frame and pressure means exerting pressure on the rolls comprising detachable pressure receiving devices communicating the counter-pressure of the means to the frame; the combination with the pressure means of a safety release device comprising a latch locking said pressure receiving devices in position to apply the pressure of the pressure means, a trip means engaging the latch and holding it against release by a movement of the trip device to release the pressure means, the trip means being substantially neutral between stable and unstable under the urge of the latch and adapted to release the latch by a movement from the neutral position, and controlling means acting on the trip means preventing release movement thereof relatively to the latch and comprising devices compelling, when actuated, a release movement of the trip means.

7. In a wringer having a frame comprising a releasable top, rolls mounted in the frame; and a pressure means exerting pressure on the rolls and counter-pressure on the top; the combination with said releasable top and pressure means a safety release device operating to release the top from the frame and with it the pressure means comprising a latch subjected to the pressure on the top through the pressure means, a trip means engaging the latch and holding it against release by a movement of the trip device to release the pressure means, the trip means being substantially neutral between stable and unstable under the urge of the latch and adapted to release the latch by a movement from the neutral position, and controlling means acting on the trip means preventing release movement thereof relatively to the latch and actuating, when operated, the trip means to effect a release.

8. In a wringer having a frame comprising a releasable top, rolls mounted in the frame; and a pressure means exerting pressure on the rolls and counter-pressure on the top; the combination with said releasable top and pressure means a safety release device operating to release the top from the frame and with it the pressure means comprising a latch subjected to the pressure on the top through the pressure means, a trip means engaging the latch and holding it against release by a movement of the trip device to release the pressure means, the trip means being substantially neutral between stable and unstable under the urge of the latch and adapted to release the latch by a movement from the neutral position, and controlling means acting on the trip means preventing release movement thereof relatively to the latch and comprising devices compelling, when actuated, a release movement of the trip means.

9. In a wringer having a frame comprising a releasable top bar, rolls mounted in the frame; and a pressure means exerting pressure on the rolls and counter-pressure on the top bar; the combination with said releasable top and pressure means a safety release device comprising a latch mounted on the top bar, a trip plate engaging the latch and holding the same against release, said trip plate having pivotal projections, a bracket on the frame forming recesses receiving the projections and forming a pivotal connection between the trip plate and the frame, said trip plate releasing the latch to release the top bar and through it the pressure means, the trip being substantially neutral between stable and unstable under the urge of the latch and acting to release the latch by a movement of the trip plate from the neutral position, and mechanism holding the trip plate normally in set position and effecting, when actuated, a release.

WALTER L. KAUFFMAN, II.